M. HAHN.
DEVICE FOR SKINNING SCALDED ALMONDS.
APPLICATION FILED FEB. 2, 1914.
1,126,991.
Patented Feb. 2, 1915.
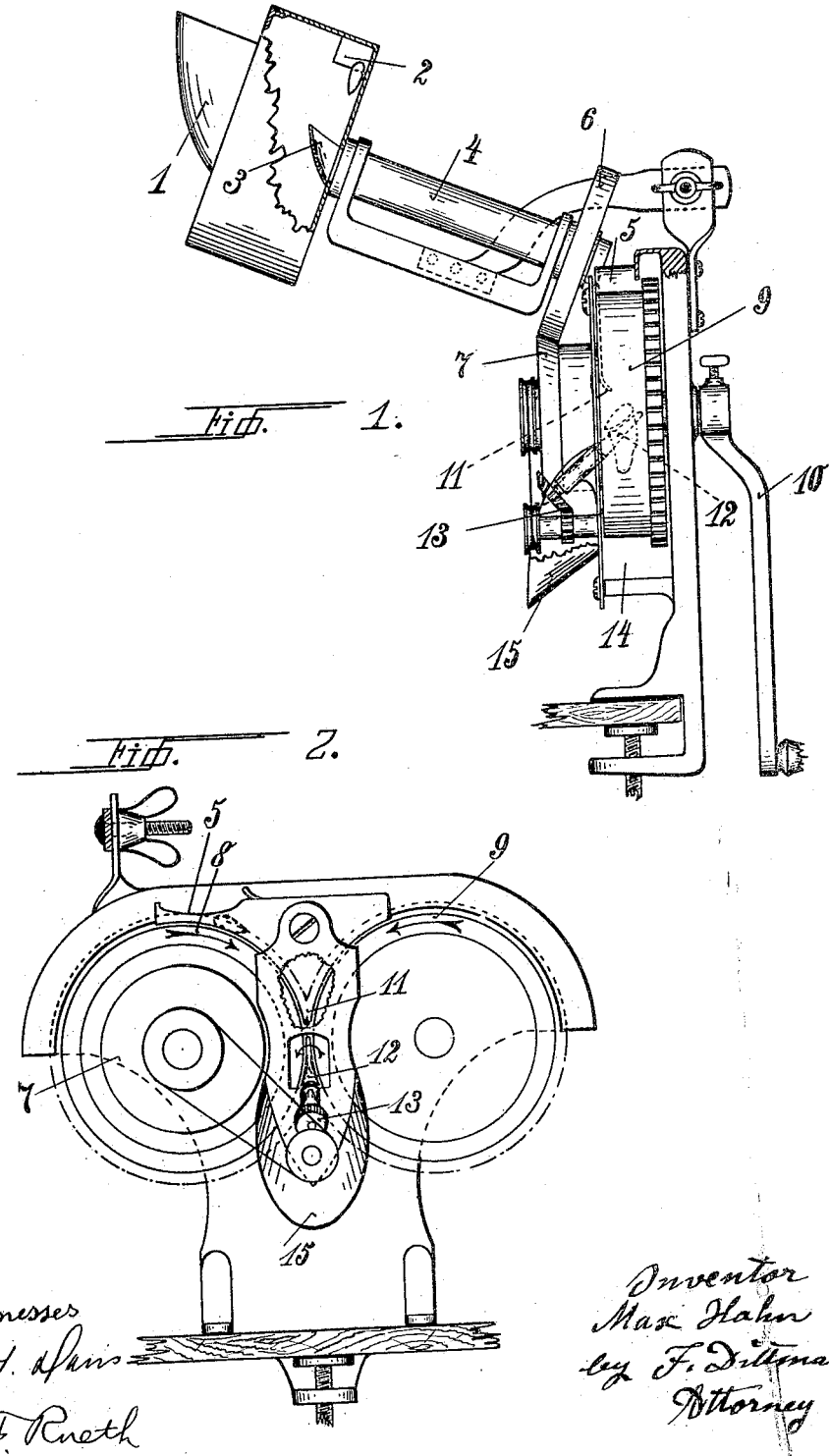

UNITED STATES PATENT OFFICE.

MAX HAHN, OF ZWICKAU, GERMANY.

DEVICE FOR SKINNING SCALDED ALMONDS.

1,126,991.  Specification of Letters Patent.  Patented Feb. 2, 1915.

Application filed February 2, 1914. Serial No. 816,076.

*To all whom it may concern:*

Be it known that I, MAX HAHN, a subject of the King of Saxony, residing at Zwickau, Saxony, German Empire, have invented certain new and useful Improvements in Devices for Skinning Scalded Almonds, of which the following is a specification, reference being had therein to the accompanying drawing.

The object of the invention is a machine using revolving rubber rolls, for skinning almonds used for pastry.

The essential part of the invention is that the almonds, moistened in the manner known, being brought to two rubber rolls, which are made to revolve automatically, are turned off to the side and separated from the skins by means of a pin turning between the rubber rolls.

The device is shown in the drawing in: Figure 1 in side elevation, and in Fig. 2 in an end view without drum superstructure.

The almonds that are to be skinned are poured into the revolving drum 1 and the carrier 2 discharges an almond when it stands on end into the trough 3, which guides it through the tube 4 on to the rubber disk 8 at 5, from where it falls between the two rubber rolls 8 and 9. In front of these rolls lies a tongue 11, which guides the almond as far as possible backward between the two rubber rolls 8 and 9 until it is stopped by the obliquely disposed pin 12 which is moved by the gearing 13. By means of the rubber rolls 8 and 9 in conjunction with the pin 12 the skin of the almond is removed and delivered into the space 14, while the skinned almond slides forward on the pin 12 and falls into the delivery chute 15. The drum 1 is made to revolve by means of friction gearing 6 and 7.

The device is operated as follows:—A crank 10, revolves the main shaft, which carries a pulley 10$^a$, the pulley being connected by a cord to a pulley provided with cogs the cogs meshing with the cogs 13, carrying the pin 12. The friction wheel 7, being mounted on the main shaft drives the friction wheel 6, which supports the tube 4, supported, in turn on a bracket 4$^a$. The remainder of the operation has been already described hereinabove.

Having now described the invention and the manner in which it is operated, what I claim and desire to secure is—

1. A device for skinning scalded almonds, comprising two rubber rolls adapted to revolve toward each other, a pin revolving between said rubber rolls, whereby the almonds are turned off sidewise, while the separated skins pass through the small gaps between the pin and the rubber rolls.

2. A device for skinning scalded almonds comprising a supporting frame, rubber rolls on said frame adapted to revolve toward each other, a main shaft on said frame which connects with power, a pulley connection between said shaft and a stub shaft having cogs thereon, an inclined pin having gearing to connect with said cogs and to rotate said pin, and friction wheels operated by said main shaft between which said pin extends.

3. In a device for skinning scalded almonds, comprising a supporting frame carrying the main shaft which connects with power, a pulley connection between said shaft and a stub shaft having cogs thereon, an inclined pin having gearing to connect with said cogs and to rotate said pin, a friction rubber roll on said main shaft, a friction rubber roll rotated by the roll on the main shaft, a pin extending between said rolls and means to feed the almonds to the skin removing mechanism and means to discharge the meats and the skins into separate channels.

In testimony whereof I affix my signature in the presence of two witnesses.

MAX HAHN.

Witnesses:
LEO A. BERGHOLZ,
PAUL ARRAS.